Figure 1:
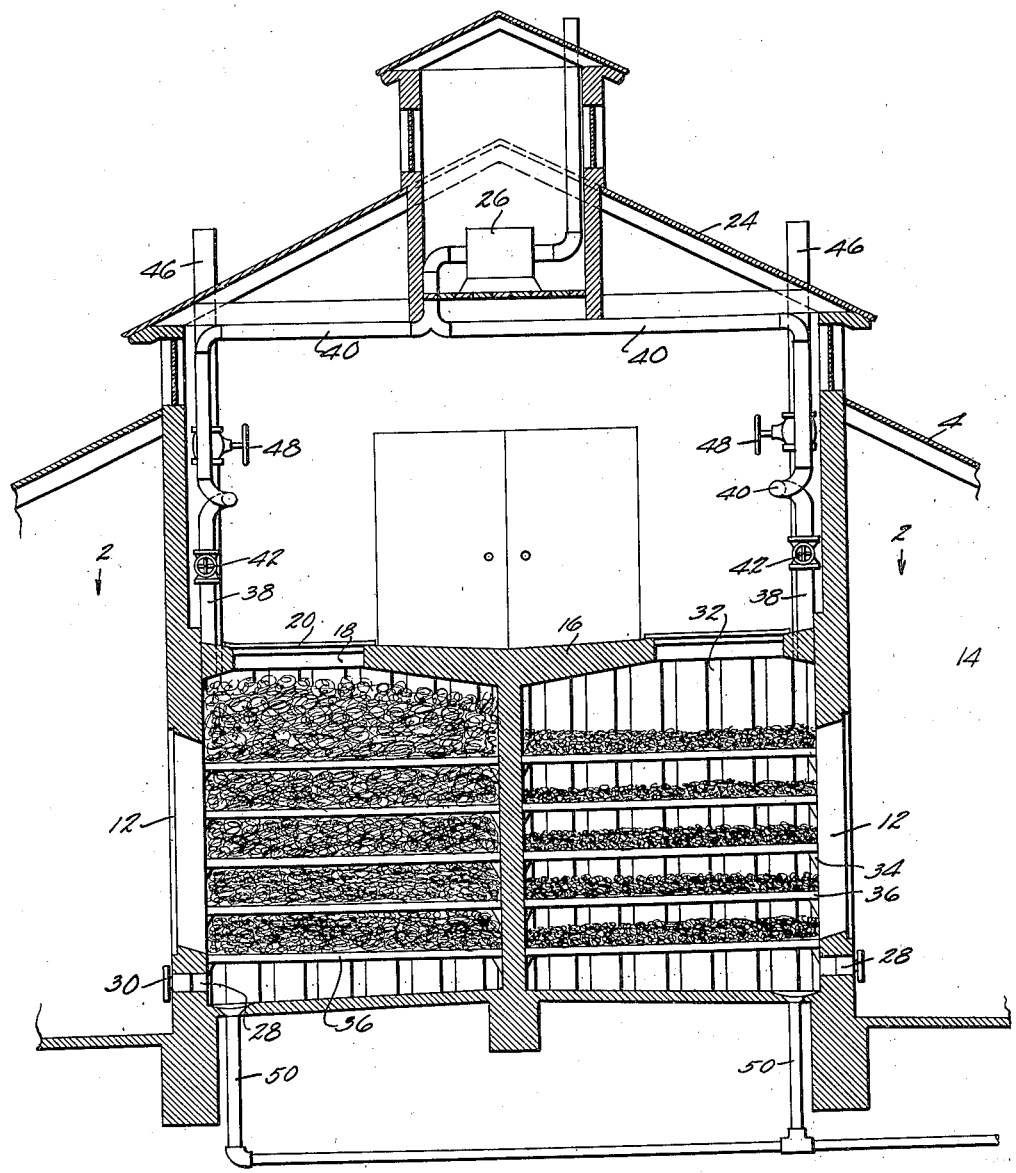

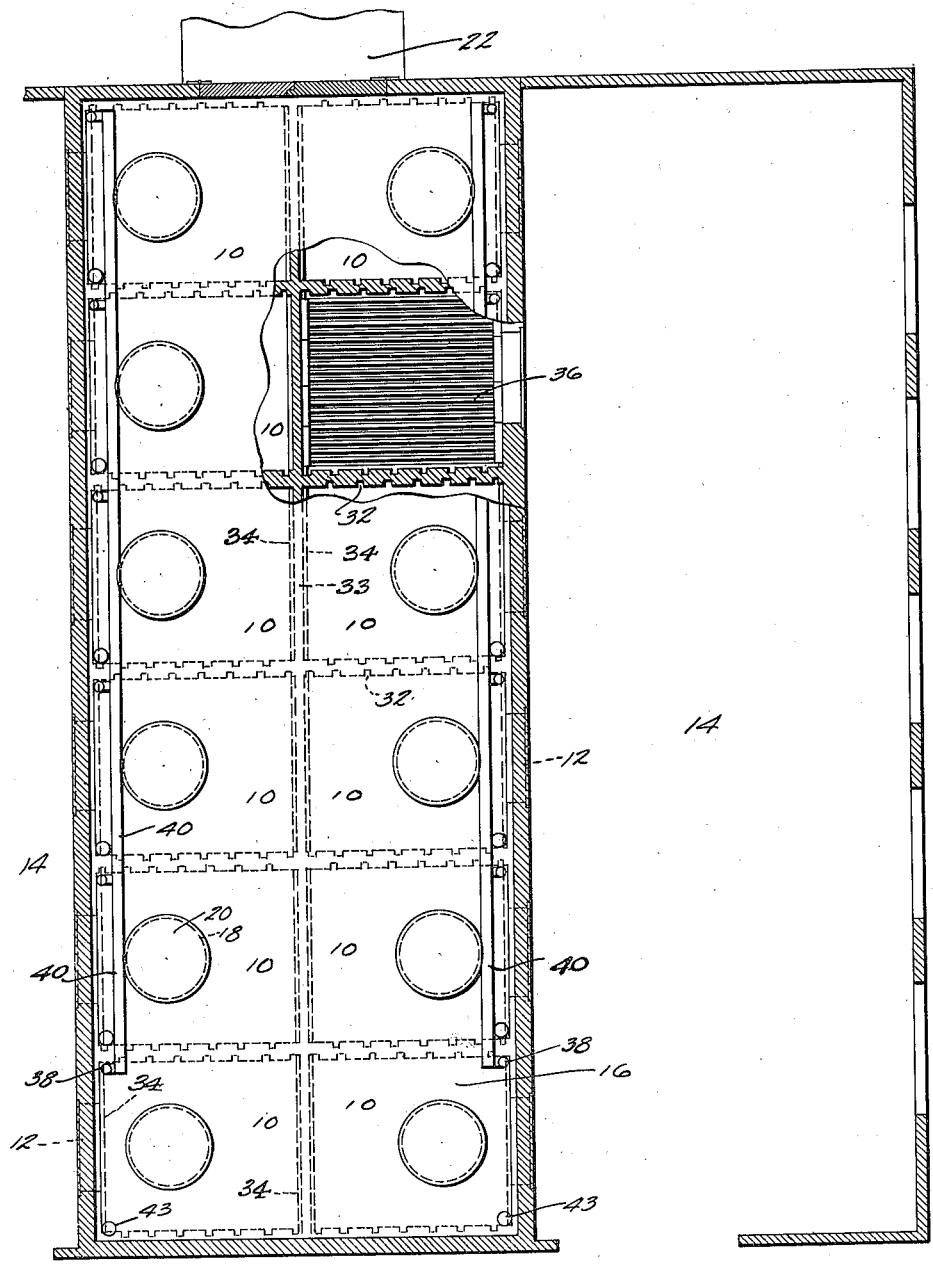

Patented Aug. 4, 1936

2,049,889

UNITED STATES PATENT OFFICE 2,049,889

METHOD OF TREATING GARBAGE

Arthur Boniface, Scarsdale, N. Y.

Application June 8, 1928, Serial No. 283,788

5 Claims. (Cl. 71—6)

This application relates to a method whereby garbage may be readily and inexpensively converted into a good grade of fertilizer.

According to my invention, the garbage is subjected to two distinct treatments. In the first part of the treatment, the garbage is enclosed against the access of air so as to stimulate the action of the anaerobic bacteria which cause the mass to break down, and liquefy the readily decomposable elements which tend to give off objectionable odors. After this action has proceeded for a sufficiently long time to destroy such readily decomposable ingredients, the mass is subjected to the action of a current of air which stops the action of the anaerobic bacteria and perhaps initiates the action of aerobic bacteria. However, the air tends to dry the mass out and as it drys, decomposition stops and finally a good grade of fertilizer is obtained free from noxious odors. The gases given off during the first part of the process are preferably subjected to some scrubbing treatment which will remove the odor from them, and this treatment is preferably continued for a short time after air is admitted until the evolution of bad smelling gases stops.

My invention can best be explained in conjunction with the accompanying drawings which show an illustrative example of a structure which has been successfully used for carrying out my invention. In these drawings, Fig. 1 shows a transverse sectional elevation through the main portion of such structure and Fig. 2 shows a sectional plan on line 2—2 of Fig. 1.

The main part of the structure consists of a series of cells 10 the walls of which are preferably made of masonry or concrete. These cells are provided with side doors 12 which may open into side sheds 14. The cells 10 are provided with a masonry or concrete roof structure indicated at 16, through which are filling openings 18 provided with covers 20. If desired, a ramp as indicated at 22 may be provided so that the garbage wagons may be driven up into the building for readily filling the cells 10. Above the cells 10 is a superstructure 24 containing the valves, etc. for regulating the outflow of gases from the cells, and near the roof is a scrubber 26.

Each cell 10 has a bottom air inlet 28 which may be closed in any desired way as by a plug 30. Vertical openings 32 are also formed in some or all of the walls of the cells 10. In the present example, they are shown as formed in the transverse walls. The outside walls and the center wall 33 are shown as provided with a series of supports 34 adapted to receive a series of sectional racks 36. The racks 36 are made of strips of wood connected together by cross bars and are assembled in units sufficiently narrow so that they may be inserted through the filling openings 18.

Extending up from each cell 10 is a fume pipe 38 which connects to a header 40 but may be shut off from this header by valve 42. The headers 40 are connected with the intake of the scrubber 26. Each cell 10 likewise is provided with an air vent pipe 43 which leads to an outside vent pipe 46 and is provided with a valve 48.

In order that some idea may be had in regard to the size of these vents, I may state that I have found it satisfactory to form the cells about 8 feet square and have the air inlets 28 about 7 inches square. In such case, I have used 6-inch pipe for the fume pipes 38 in order that all gases generated during the first part of the process may escape freely; and have used 8-inch pipe for the air vents 43, so that during the second part of the process there may be a rapid circulation of air. Each cell 10 is preferably provided with a drain pipe 50 which may be connected with the sewer or any appropriate disposal point; if desired, the liquid collected from these drain pipes may even be used as a liquid fertilizer, but this may not usually be desirable owing to its smell.

In operating the device, the bottom set of racks 36 is put in place and then garbage is dumped into the cell until it reaches up to about the next line of supports 34. Another set of racks 36 is inserted and more garbage put in and another set of racks inserted, and this is continued until the cell is practically filled, as shown on the left hand side in Fig. 1. Ordinarily it is advisable to add lime during the filling operation, as the garbage should be slightly alkaline. I have found it advisable to space the supports 34 at not more than 24 inches, and preferably not more than 15 inches apart. The cover 20 is put on, air inlets 28 and valves 48 are closed, and valves 42 are opened. The garbage soon starts to ferment and heat up. When the mixture has reached approximately its maximum temperature, which may be ascertained by a test thermometer, the first stage of the process is completed. This will ordinarily take from about three to seven days, depending on the outside temperature. During this period, a considerable amount of foul gas will be given off, but the smell can all be eliminated by the use of scrubber 26 which is of a type that can be purchased in the open marget for use with a chemical scrubbing agent, such as sulphuric acid or potassium permanganate.

After the garbage has come to a temperature equilibrium—that is, has ceased to show any further marked temperature rise—the air vents 28 are opened. The air will flow in under the bottom set of racks 36 and pass upward through the vertical channels 32. At the same time it will be found that the garbage has settled appreciably so that horizontal air passages will be left under each set of racks 36, as shown on the right hand side of Fig. 1, permitting a relatively free access of air to the mass. If the racks 36 are not used, or if they are positioned too far apart, the air will not permeate sufficiently to end the anaerobic action, and drying out will be so slow, that from a practical standpoint no beneficial results can be obtained.

For the first few days after the air inlets 28 are opened, the gases coming over will still need to be scrubbed, but after four or five days, the objectionable odor will cease, and the valves 48 can be opened and valve 42 closed, permitting the free passage of air through the mass which is left in place until practically dry. Ordinarily the garbage will be found to have reached this state after a total period of from about thirty to thirty-five days. The doors 12 are then opened and the dry material shoveled out. It may then be used directly as fertilizer or it may be subjected to a shredding operation to break up any material such as paper which may have been introduced and not properly decomposed.

It may be noted that even if the plugs 30 are not inserted during the first part of the operation, there will be relatively little access of air to the mass, until the volume of the mass has been substantially reduced by the preliminary decomposition, though the use of some means for closing passages 28 is ordinarily advisable.

What I claim is:

1. The method of treating organic refuse which comprises enclosing a relatively large quantity of such refuse so that anaerobic fermentation will occur, and permitting such anaerobic fermentation to continue while supporting the refuse at spaced intervals and permitting the same to drain, so that the mass is divided into a plurality of separated parts, and thereafter permitting a large volume of air to flow around and through such separated parts so that the same are dried out.

2. The process of treating garbage which comprises the steps of filling a cell with garbage, positioned in distinct layers, permitting anaerobic fermentation to take place until the individual layers have settled appreciably to form intervening spaces and the material has substantially reached a temperature equilibrium and then permitting a relatively large current of air to enter the cell and flow through such intervening spaces, whereby the anaerobic action is stopped and the mass dried out.

3. The method of converting organic matter which comprises sealing the organic matter in confined air in relatively loose superimposed and separated masses, maintaining the confined air and organic matter sealed until the temperature developed by the organic matter is approximately at its maximum, and thereafter causing currents of external air to flow successively through the superimposed masses of organic matter until they are dehydrated.

4. The method of converting organic matter comprising sealing organic matter in confined air in relatively loose superimposed masses, maintaining the confined air and organic matter sealed until the temperature developed by the latter is at an approximate maximum, collecting aqueous substance from said matter and diverting it therefrom, placing the organic matter in communication with the external atmosphere and causing currents of external air to flow through and between the superimposed masses of organic matter until it is dehydrated.

5. The method of converting garbage to humus which comprises enclosing a relatively large quantity of such garbage so that anaerobic fermentation will occur, and permitting such fermentation to continue while supporting the garbage at spaced intervals and permitting the same to drain, so that the mass is divided into a plurality of separated parts, and thereafter permitting a large volume of air to flow around and through such separated parts so that the same are dried out.

ARTHUR BONIFACE.